United States Patent [19]

Pullen

[11] Patent Number: 5,335,297
[45] Date of Patent: Aug. 2, 1994

[54] TARGET DETECTION FOR VISION SYSTEMS

[75] Inventor: Michael W. Pullen, Ridgecrest, Calif.

[73] Assignee: The United States of Americas as represented by the Secretary of the Navy, Washington, D.C.

[21] Appl. No.: 55,455

[22] Filed: May 3, 1993

Related U.S. Application Data

[63] Continuation of Ser. No. 822,518, Jan. 17, 1992, abandoned.

[51] Int. Cl.$^5$ .............................................. G06K 9/38
[52] U.S. Cl. ........................................ 382/50; 382/53; 382/48; 358/466
[58] Field of Search ...................... 382/22, 29, 48, 53, 382/52, 50; 358/465, 466, 103, 108, 105

[56] References Cited

U.S. PATENT DOCUMENTS

| | | | |
|---|---|---|---|
| 4,242,702 | 12/1980 | Kuni et al. | 358/106 |
| 4,801,788 | 1/1989 | Osaka | 382/53 |
| 4,850,029 | 7/1989 | Moyer et al. | 382/52 |
| 4,979,036 | 12/1990 | Smith et al. | 358/105 |
| 5,052,045 | 9/1991 | Peregrim et al. | 382/48 |

*Primary Examiner*—Yon J. Couso
*Attorney, Agent, or Firm*—Harvey A. Gilbert; Melvin J. Sliwka; John L. Forrest, Jr.

[57] ABSTRACT

An autonomous real-time adaptive video target detection and position location apparatus and method. Adaptive low pass filters produce horizontal leading and trailing edge and vertical thresholds from each frame of input target and a background or clutter video signal. A user selectable input is used with the three adaptive thresholds, input video, and horizontal synchronization signal to produce a signal representing valid target detection and position information.

9 Claims, 8 Drawing Sheets

TARGET DETECTION FOR VISION SYSTEMS

This application is a continuation of co-pending application Ser. No. 07/822,518 filed on Jan. 17, 1992, now abandoned.

The present invention relates to video target detection and in particular autonomous detection of contrast bounded targets in video vision systems.

Previous methods of autonomous target detection implemented by analog processors have had two significant problems. First, valid targets could not be detected at ranges sufficient for the delivery of ordnance in certain military operational situations. Second, previous detection methods were prone to false alarms and would indicate target detection where no valid target existed.

Typical detection configurations used single threshold values. Video above the threshold was declared to be a target when the target met the required size and shape criteria.

Newer methods are taking advantage of microprocessor and digital signal processor (DSP) devices and systems. Generally, these digital techniques require a sizable amount of computing and mathematical power to deal with the large amount of data that an image represents. The detection algorithms are generally based on a statistical model of the target and the noise and clutter surrounding the target. Typically, the value of the threshold is chosen based on the assumption that the noise or clutter around the target is stationary or gaussian in nature. For the infrared case, single fixed detection thresholds have never worked.

SUMMARY OF THE INVENTION

Thus, it is one object of the present invention to provide an apparatus and method to perform video signal processing for autonomous detection of valid targets at ranges sufficient to permit delivery of ordnance in a broad spectrum of military applications.

It is also an object of the present invention to provide an apparatus and method for performing video target detection which eliminates or minimizes false target determinations.

It is another object of the present invention to provide an apparatus and method for performing autonomous target detection that is physically compact, functionally and operationally not complex or demanding, and not algorithmically constraining.

It is still another object of the present invention to provide an apparatus and method for performing autonomous video target detection using multiple detection thresholds.

It is finally another object of the present invention to provide an apparatus and method for performing autonomous video target detection employing real-time adaptive filtering to produce the target video edge and size detecting thresholds.

The present invention is an autonomous target detector. It is a combination of low pass filters and logic elements connected to receive input video and adaptively produce real-time horizontal leading and trailing edge thresholds and a size threshold for processing each frame of standard television video input in conjunction with a user selectable window to produce an output signal representing detection of a valid target. The synchronization information that is a part of the video picture signal is detected and used to define, at any given time, the position of any scene detail within the raster or screen.

The benefits, features, and advantages of the present invention as discussed above and hereinafter will be more clearly understood upon consideration of the detailed description and accompanying drawings which follow.

BRIEF DESCRIPTION OF THE DRAWINGS

In the following detailed description, reference will be made to the attached drawings in which.

DETAILED DESCRIPTION

Figure 1:
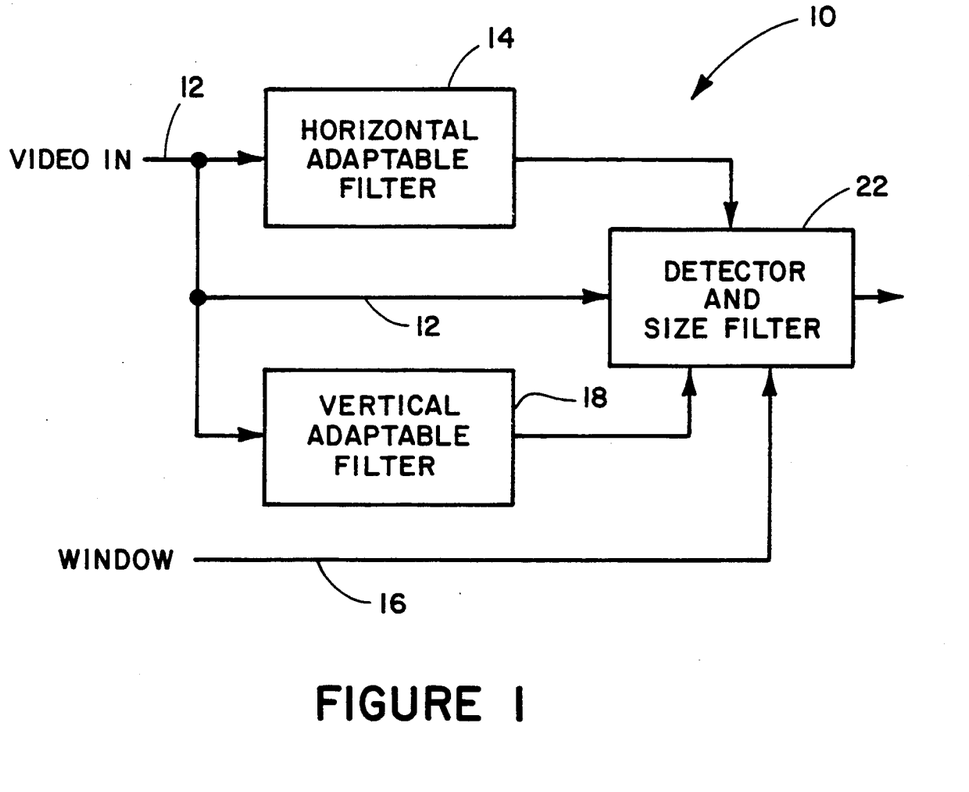
FIG. 1 is a functional block diagram of the present invention.

As shown in FIG. 1, the autonomous target detector 10 of the present invention consists of the horizontal adaptable filter 14 and the vertical adaptable filter 18 connected in parallel with each other and with the video input signal 12 and the user selectable window signal 16, all of which are individually connected to the detector and size filter 22.

Figure 2:
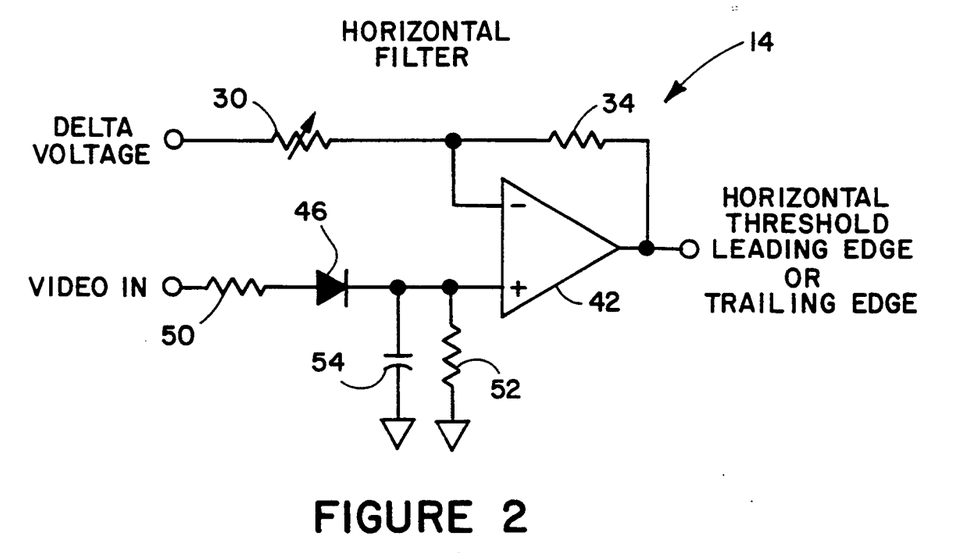
FIG. 2 is a schematic diagram of the horizontal adaptable filter of the present invention.

The horizontal adaptable filter 14 consists of two adaptive horizontal threshold low pass filters 24 as depicted in FIG. 2. In its simplest form each adaptive horizontal threshold filter 24 consists of the resistors 30 and 34 connected as a voltage divider with their common connection connected to the negative input to the operational amplifier 42. The delta voltage for biasing the operating level of each adaptive threshold circuit 24 of the two used in the horizontal adaptable filter 14, above or below the baseline level of the target video signal to factor out "noise level" is connected to the input end, or end opposite the common connection of resistors 30 and 34, of resistor 30. Resister 30 is either a user selected fixed or user variable resistor alternative embodiment for creating the leading and trailing edge thresholds as shown in FIG. 4. In FIG. 2 the video signal input 12 to the threshold circuit 24 is connected to the resistor 50 in series with the diode 46. The diode 46 in turn is connected to the capacitor 54 in parallel with the bleed resistor 52, the other ends of which are grounded, and the positive input of the operational amplifier 42. The output of the operational amplifier 42 in each of the threshold circuits 24 is the desired horizontal leading or trailing edge threshold. The outputs of the two adaptive horizontal threshold circuits, leading edge 24 and trailing edge 26 (see FIG. 5) required by the present invention are input to the comparators 15 and 17, respectively, in the detector and size filter 22 of FIG. 5. Similarly, the vertical adaptable filter 18 in FIG. 1 is shown in more detail in FIG. 3 to consist of the voltage divider comprising the resistors 58 and 62 with their common connection connected to the negative input of the operational amplifier 70. The resistor 58 is either a user selected resistor value or variable resistor set by the user. The video input is connected to the resistor 78 which is connected in series with the positive side of the diode 74. The diode 74 is connected to the ungrounded side of capacitor 82 in parallel with the ungrounded side of bleed resistor 80 and in series with the positive input to the operational amplifier 70.

The leading and trailing edge threshold outputs of adaptive horizontal threshold circuits 24 and 26 in FIG. 4 are connected to the negative inputs to comparators 15 and 17 and the vertical threshold from the vertical adaptable filter 18 is connected to the vertical comparator 19 negative input. Video inputs are connected to the positive input terminals of each of the comparators 15, 17 and 19.

Figure 4:
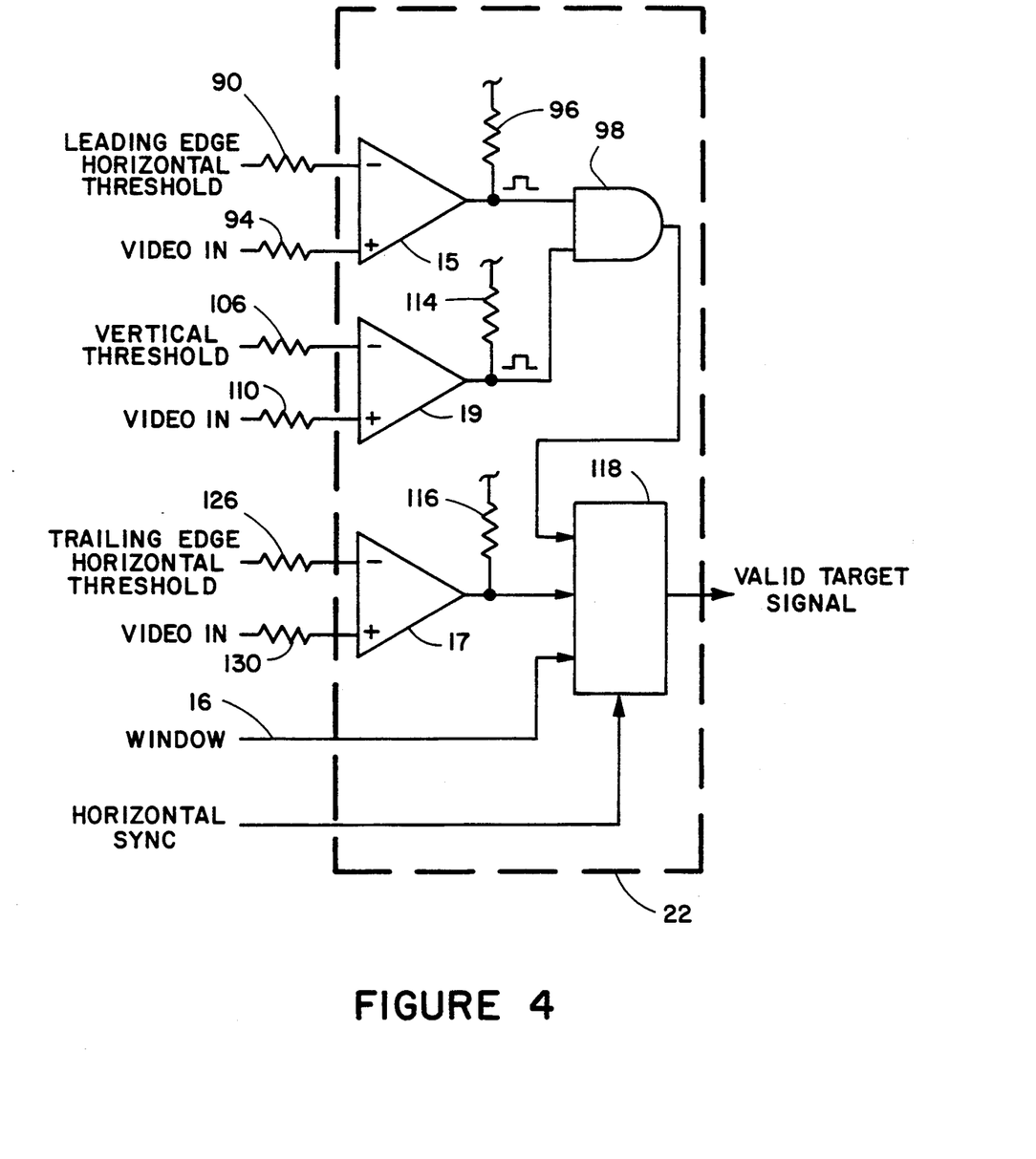
FIG. 4 is a schematic diagram of the detector and size filter of the present invention.
Figure 5:
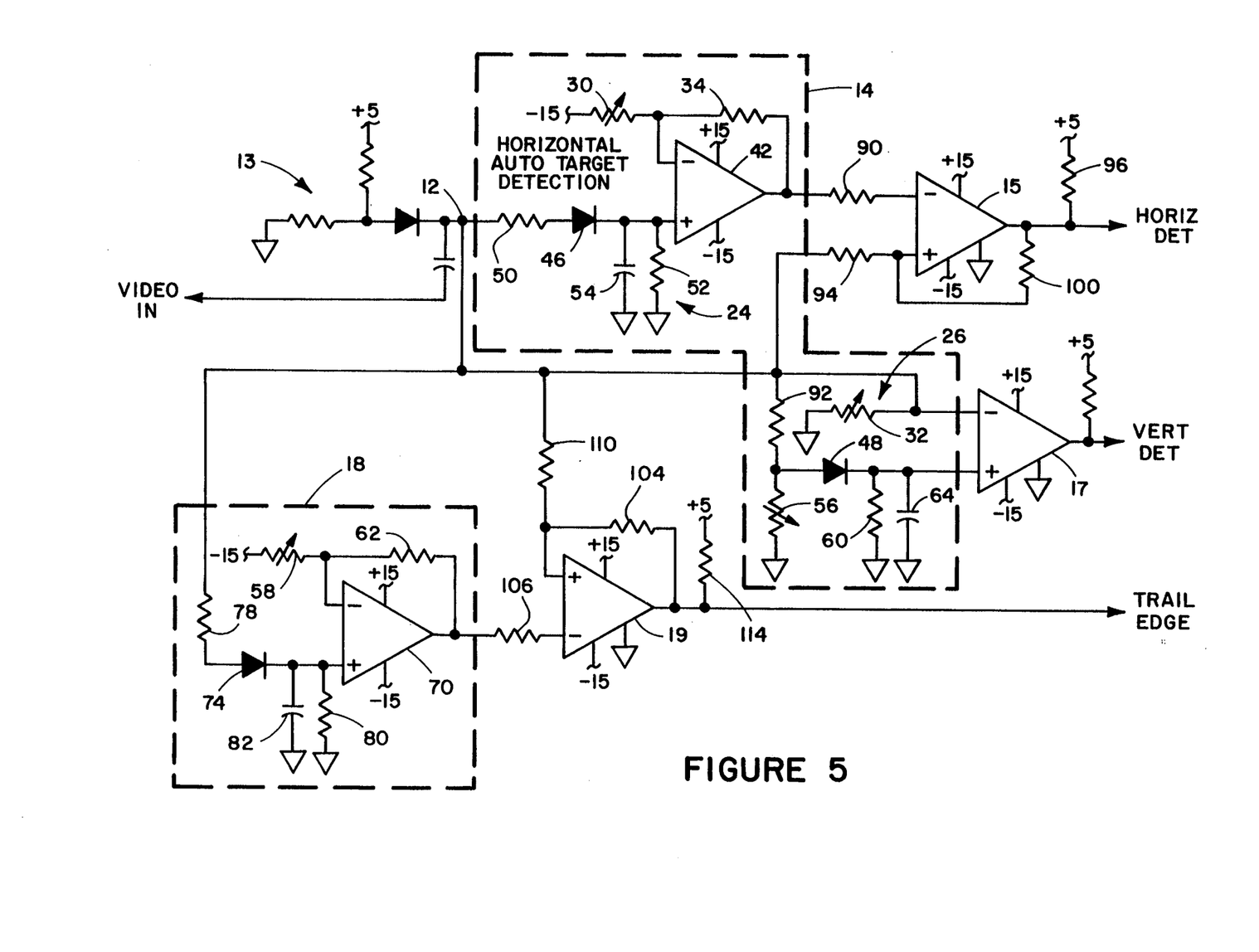
FIG. 5 is a detail schematic circuit diagram of the horizontal and vertical adaptable filters of the present invention.
Figure 6:
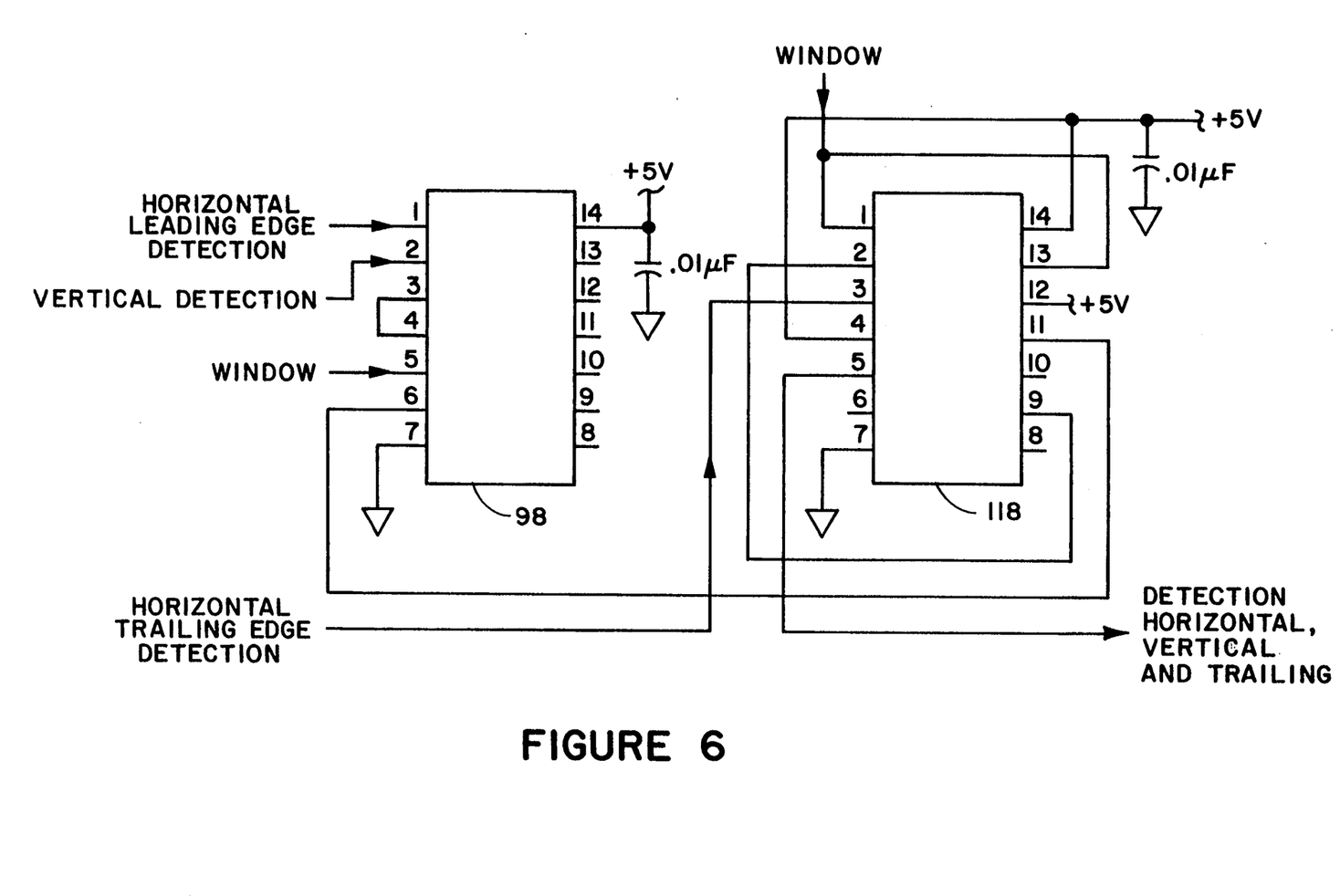
FIG. 6 is a detail schematic circuit logic elements in the detector and size filter of the present invention.

Also as depicted in FIG. 4, the output of leading edge comparator 15 is connected to pull-up resistor 96 and one input to AND gate 98, and the output of vertical comparator 19 is connected to pull-up resistor 114 and the other input to AND gate 98. The output of AND gate 98, the output of trailing edge comparator 17, connected to pull-up resistor 116 and the user-selectable window signal, and a horizontal sync signal are parallel inputs to the 2-D flip-flops 118, the output of which, if any, is a valid target signal. FIG. 5 is a more detailed schematic of one preferred embodiment of the horizontal adaptable filter 14, the vertical adaptable filter 18 and the comparators 15, 17, and 19 to which they are connected. FIG. 6 is a more detailed schematic of the connections and components used in one preferred embodiment of the detector and size filter 22 of the present invention.

Figure 3:
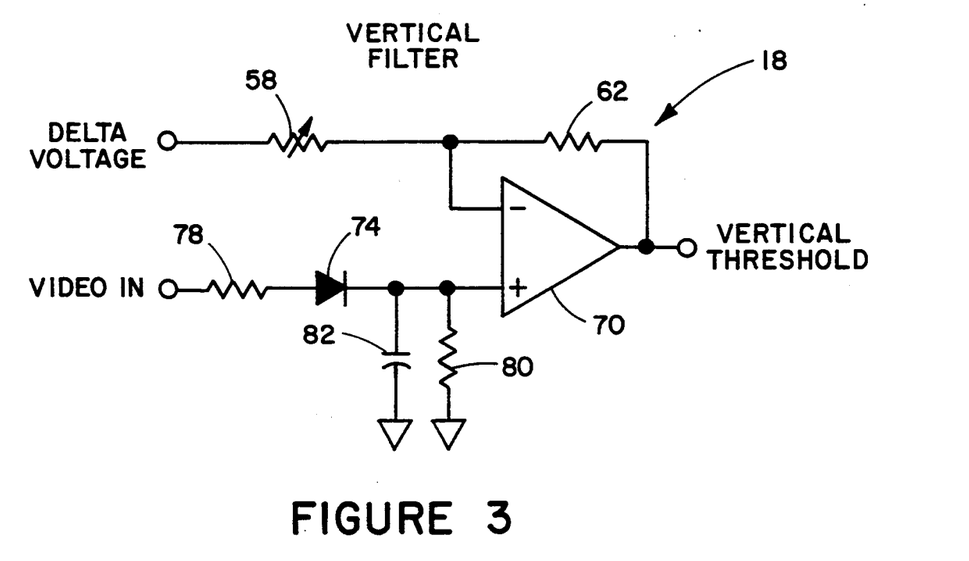
FIG. 3 is a schematic diagram of the vertical adaptable filter of the present invention.

FIG. 5 shows a detailed schematic of the adaptive horizontal leading edge threshold circuit 24 and the adaptive horizontal trailing edge threshold circuit 26 in the horizontal adaptable filter 14 for one preferred embodiment of the present invention based on the present invention depicted in FIGS. 2, 3, and 5. Video input signal is coupled to the horizontal adaptable filter 14 via the D.C. restorer input circuit 13. The input video connection to the leading edge threshold circuit 24 is at 10KΩ resistor 50 which connects in series with the positive or anode side of the IN4148 diode 46. Diode 46 is connected in series with the operational amplifier 42 and the 560 pf capacitor 54 connected in parallel with the 100KΩ bleed resistor 52. The ends of capacitor 54 and resistor 52 not connected to diode 46 are connected to ground.

The variable resistor 30 which may be a 100KΩ variable resistor is connected between a −15VDC supply and one end of 2KΩ fixed resistor 34 connecting to the negative input to the operational amplifier 42. The opposite end of the resistor 34 connects to the output of operational amplifier 42, a UA741. The voltage divider formed by resistors 30 and 34 provides the delta (Δ) or biasing voltage to the operational amplifier 42. The output of the leading edge threshold circuit 24 from operational amplifier 42 connects to the 2KΩ resistor 90 which connects to the negative input to the comparator 15.

Video input 12 from the D.C. restorer circuit 13 also connects to the 2KΩ resistor 94 connected to the positive input to comparator 15. The positive input to comparator 15 is connected through the one megohm (1MΩ) hysteresis resistor 100 to the output of comparator 15 and one end of pull-up resistor 94 is connected to one side of 10KΩ resistor 92, the positive (anode) side of diode 48, a 1N4148 diode. The opposite side of resistor 56 is grounded. The cathode side of diode 48 is connected to the ungrounded side of 100KΩ bleed resistor 60 which is connected in common with the ungrounded side of 560 pf capacitor 64 and the positive input to comparator 17. The resistor 50, the diode 46 which provides its nonlinear characteristic, and the capacitor 54 comprise the low pass filter which produces the adaptive leading edge threshold. The video input is additionally connected to the ungrounded side of variable (100KΩ) resistor and the negative input to comparator 17. The resistor 32 controls the Δ voltage on bias affecting the threshold circuit 26 and the resultant horizontal trailing edge threshold relative to the incoming video target waveform. The resistor 56, the diode 48 which contributes its non-linear characteristic, and the capacitor 64 constitute the low pass filter which produces the adaptive trailing edge threshold.

Finally, the input video is supplied to the vertical adaptable filter 18 via the 10KΩ resistor 78 which connects to the anode of the IN4148 diode 74. The cathode of the diode 74 connects to the ungrounded ends of the capacitor 82 and the 100K bleed resistor 80 connected in parallel, and with the positive input to the operational amplifier 70. The Δ voltage bias for the vertical adaptable filter 18 is produced by supplying −15VDC to the variable 100KΩ resistor 58 connected to the negative input to the operational amplifier 70. The 2KΩ resistor 62 connects between the negative input and the output of the amplifier 70 which in turn is connected to the negative input to the comparator 19 through the 1KΩ resistor 106. Input video is coupled to the positive input to the comparator 19 through the 1KΩ resistor 110. The 1 MegΩ hysteresis resistor 104 connects between the output and the positive input to the comparator 19. The 2KΩ pull-up resistor 114 connects between the output of the comparator 19 and at 5VDC power supply. The resistor 78, the diode 74 which provides its non-linear characteristic and the 0.22 μf capacitor 82 comprise the low pass filter 18 which produces the adaptive vertical threshold of the present invention.

OPERATION

Referring to the accompanying figures, video signal is simultaneously input via the signal stabilizing circuit 13, a D.C. restore circuit, to the adaptive horizontal leading edge and trailing edge threshold circuits 24 and 26, respectively, in the horizontal adaptable filter 14, and the vertical adaptable filter 18. The stabilized video signal is also simultaneously input to the leading edge comparator 15, the trailing edge comparator 17, and the vertical comparator 19.

Figure 7:
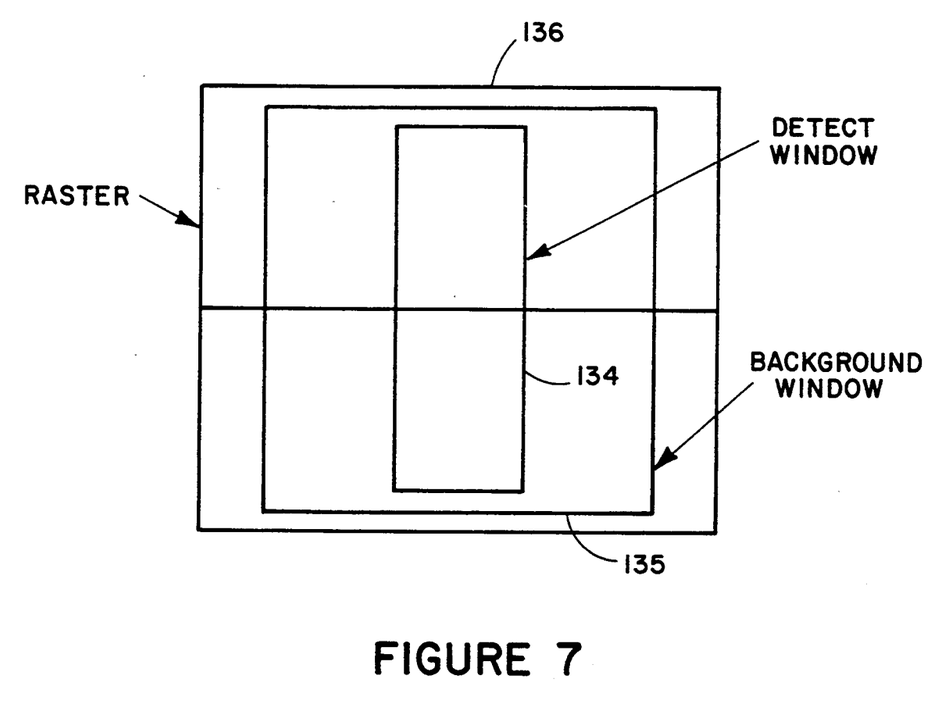
FIG. 7 is a view of autonomous windows within the video raster.
Figure 8:
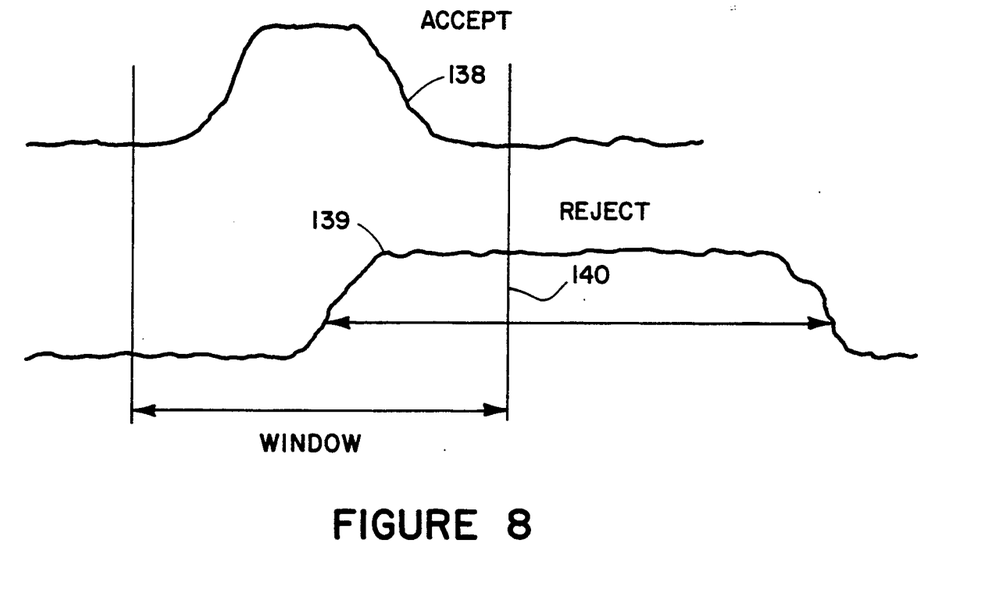
FIG. 8 is a view of target signals within an autonomous window.

As shown in FIG. 7, based on the size of target relative to background initially observed by the user, a detect window 134 and, if desired, a background window 135 may be established to localize the area of the raster 136 subject to adaptive filtering for target detection. FIG. 8 depicts an adversary target 138 fully within the user selected window 140. Thus selected, the target 138 is accepted for processing by the present invention. The large background target 139, such as a mountain, not fully captured within the window 140 is rejected and not processed. The convolving of the detection window 134 with the leading, trailing and vertical comparator outputs (24,26,18) requires either a horizontal motion of the detection window within the imaging raster or horizontal motion of the vision system apparatus providing the video input. Selection of the window width determines the acceptable target width size with multiple windowing allowing for on the fly selectable sizing. Sizing has been traditionally done with bandpass filters. This does not work well. Bandpass filters pass edges (mountain slopes) or step functions as well as bounded targets (airplanes). Only the detection of both leading and trailing edges of a target within the acceptable size constraint window 134 allows for positive contrast bounded target determination.

Figure 9:
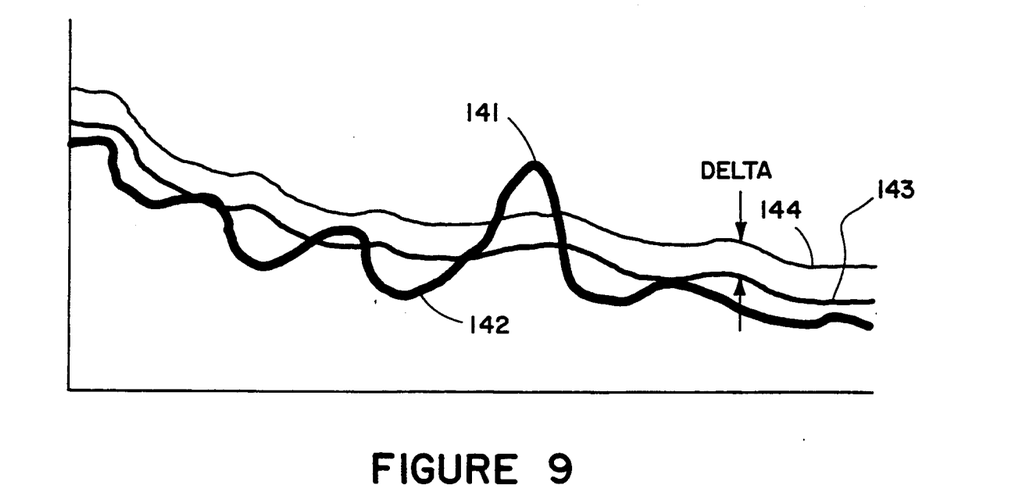
FIG. 9 is a view of video input with overlaid thresholds including a delta biased threshold.
Figure 10:
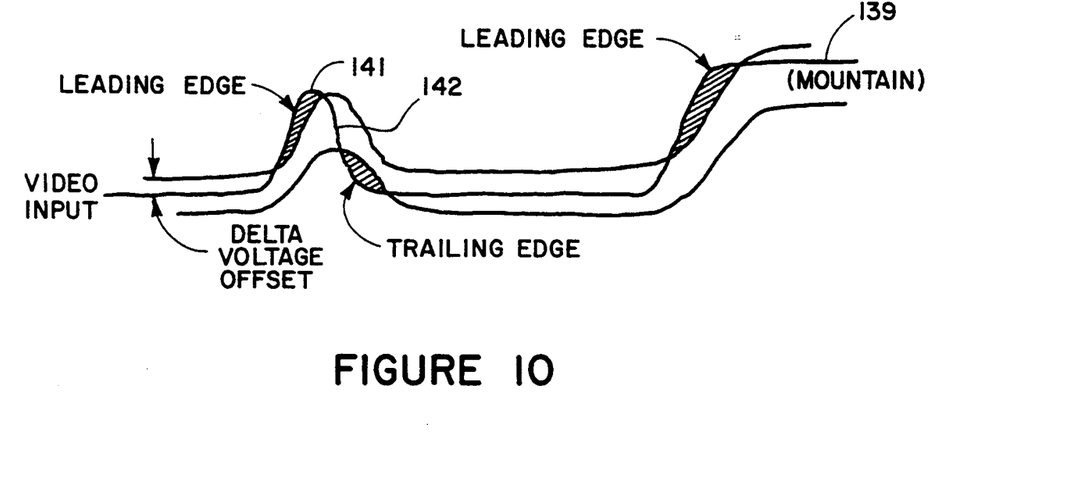
FIG. 10 is a graphical representation of the input video signal and the horizontal leading and trailing edge adaptive thresholds of the present invention.
Figure 11:
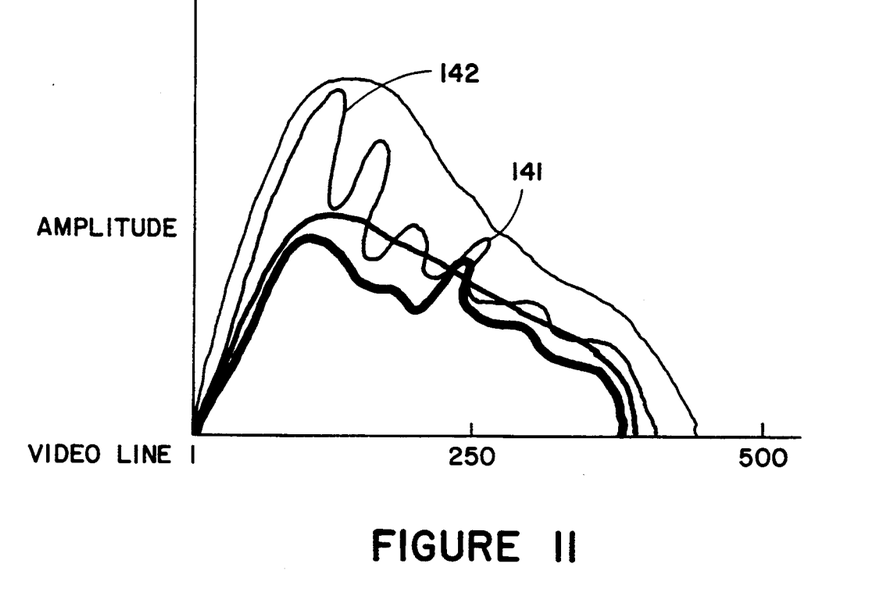
FIG. 11 is a graphical representation of a single frame of video image including target and background or clutter with the adaptive vertical threshold of the present invention.

The delta voltage supplied to the negative inputs of the operational amplifiers 42 of the leading and trailing edge threshold circuits 24 and 26, respectively, and the operational amplifier 70 of the vertical adaptable filter 18 bias the thresholds created by each of these circuits at a user selectable level above the high frequency and low frequency shading noise level accompanying any apparent target signal in the incoming video. FIG. 9 depicts the effect of a delta voltage. Thus, the incoming video signal bearing an apparent target 141 accompanied by lesser signal variations constituting noise is shown in relation to the unbiased adaptive threshold 143 of the present invention which permits the detection of some of these variations with the apparent target and in relation to the delta voltage biased threshold 144 which lies above all the non-target variations, permitting only the apparent target 141 to be processed.

Thus, with the delta voltages set for the horizontal leading and trailing edge threshold circuits 24 and 26, respectively, and the vertical adaptable filter 18, to bias the adaptive thresholds above the noise signals (in either a positive or negative signal direction) accompanying the apparent target signal, and with the user selectable window set to localize detection to a small target such as an aircraft compared to a large background object such as mountains within the field of view, the present invention is enabled or made operative for the particular incoming video signal and apparent target.

With reference to FIGS. 2 and 4 it can be seen that the stabilized video input signal 12 is introduced to the diode 46 and the low pass RC filter composed of resistor 50 and capacitor 54 in both the adaptive horizontal leading and trailing edge threshold circuits 24 and 26, respectively. The diode 46 in both circuits passes the positive peaks of the incoming video. The RC time constant of the low pass filter comprised of resistor 50 and capacitor 54 is set at 5.6 $\mu$sec with the decay to occur about ten (10) times slower than the attack or sample rate. The filter output is the threshold used to perform the target detection function. The cutoff frequency of the horizontal leading and trailing edge circuits 24 and 26 is set by the user for target detection sensitivity and is always above the horizontal line rate of the input video (15,750 Hz) by adjusting resistor 50 or capacitor 54.

The vertical adaptable filter 18 operates similar to the horizontal adaptable filter 14 except that the passband for peak detection is greater than the field frequency of the input video (60 Hz) but is less than the horizontal line rate frequency and is user selectable by choice of resistor 78($R_v$). The filter decay rate is 5 to 10 times slower than the peak detection time constant. The primary purpose of the vertical filter 18 is to prevent false alarms in high clutter settings or alternating high and low clutter settings. Numerous clutter items or large clutter items tend to push the vertical detection threshold up and prevent false alarms by virtue of the nonlinear characteristic of the filter. Benign clutter environments allow this threshold to fall. Its time constants allow for adapting to various conditions within the raster.

The adaptive horizontal leading and trailing edge thresholds and the vertical thresholds are introduced with the window and horizontal synch signals to the detector and size filter 22. See FIGS. 4, 5 and 6. The leading edge threshold is input to comparator 15 via resistor 90 and the video signal via resistor 94. If the video bears an apparent target which exceeds the leading edge threshold, the comparator 15 outputs a signal at resistor 96. Similarly if the apparent target in the video input to the comparator 19 received via the resistor 110 exceeds the vertical threshold input at resistor 106, the comparator 19 outputs a signal at resistor 114. The signal at resistor 96 indicating an exceeded leading edge horizontal threshold and the signal at resistor 114 indicating the exceeded vertical threshold produce an output at AND gate 98 which is input to the 2-D flip-flops 118.

The horizontal trailing edge threshold and the video signal bearing the apparent target are input to the comparator 17. If the threshold is exceeded by the apparent target signal, a signal indicating that event is output by the comparator 17 and provided as an input to the 2-D flip-flops 118. That signal, the input from AND gate 98, the user-selected window signal and a horizontal sync signal are the inputs that must occur at the inputs to 2-D flip-flops 118 in order for a valid target signal output to be produced from the detector and size filter 22. This technique requires no previous video information or statistical information or frame delays for processing and can therefore work at very high vision systems apparatus panning speeds.

It is believed that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely exemplary embodiments thereof.

What I now claim as my invention is:

1. An apparatus for autonomously detecting in real-time the presence of a target in each frame of an input video signal, said apparatus comprising:

a first adaptive means for producing a horizontal threshold for the leading edge and a horizontal threshold for the trailing edge of a video waveform representing a possible target when said waveform is contained in said video signal;

a second adaptive means for producing a vertical threshold from each video frame of a possible target and its surroundings;

a user adjustable means for providing a window for each video frame within which the presence of video waveform exceeding said horizontal and vertical thresholds indicates a possible target location; and a means for comparing comprising of a first comparator for comparing said video input signal with said horizontal leading edge threshold, a second comparator for comparing said video input signal with said vertical threshold, and a third comparator for comparing said video input signal with said horizontal trailing edge threshold, and a means for ANDing the outputs of said first comparator and said second comparator, and inputting the ANDed result with the output resulting from said third comparator, said window, and a horizontal sync signal for each video frame to flip-flop having a valid target signal as its output.

2. The apparatus of claim 1 wherein said first adaptive means for producing a horizontal leading edge threshold is a low pass filter having a peak detecting means.

3. The apparatus of claim 1 wherein said first adaptive means for producing a horizontal trailing edge threshold is a low pass filter having a peak detecting means.

4. The apparatus of claim 2 wherein said peak detecting means has a time constant approximately 1 to 10 times the constant of said low pass filter.

5. The apparatus of claim 3 wherein said peak detecting means has a time constant approximately 1 to 10 times the constant of said low pass filter.

6. The apparatus of claim 1 wherein said second adaptive means for producing vertical threshold is a low pass filter having a peak detecting means.

7. The apparatus of claim 6 wherein said peak detecting means has a time constant approximately 1 to 10 times the time constant of said low pas filter.

8. The apparatus of claim 2 or claim 3 wherein the cutoff frequency of said low pass filter is higher than the horizontal line rate of the input video, and is user selectable for target detection sensitivity.

9. The apparatus of claim 6 wherein the pass band for said low pass filter is somewhat greater than the field rate (60 hz) of the input video, but less than the horizontal line frequency of the video and is user selectable.

* * * * *